United States Patent
Duvall et al.

(12) 
(10) Patent No.: US 6,640,147 B1
(45) Date of Patent: Oct. 28, 2003

(54) METHOD AND APPARATUS FOR LATE BUFFER PROCESSING

(75) Inventors: Roger Mather Duvall, Garden Grove, CA (US); Richard Joseph Oliver, Laguna Beach, CA (US)

(73) Assignees: Sony Corporation (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 08/936,635

(22) Filed: Sep. 24, 1997

(51) Int. Cl.[7] .................... G06F 17/00; H04B 15/00; G11B 20/10
(52) U.S. Cl. ............... 700/94; 381/94.5; 369/47
(58) Field of Search .................. 709/217, 219; 369/47; 700/94; 381/94.5; 704/500–504

(56) References Cited

U.S. PATENT DOCUMENTS

| | | | | |
|---|---|---|---|---|
| 5,153,579 A | * | 10/1992 | Fisch et al. | 379/67 |
| 5,761,434 A | * | 6/1998 | Hewitt | 395/200.61 |
| 5,907,822 A | * | 5/1999 | Prieto, Jr. | 704/202 |
| 6,076,062 A | * | 6/2000 | Van Steenbrugge | 704/500 |
| 6,131,138 A | * | 10/2000 | Packer et al. | 369/14 |
| 6,205,419 B1 | * | 3/2001 | Fiedler | 369/47 |

FOREIGN PATENT DOCUMENTS

JP 63201937 * 8/1988 ............ 369/100

* cited by examiner

*Primary Examiner*—Forester W. Isen
*Assistant Examiner*—Laura A. Grier
(74) *Attorney, Agent, or Firm*—Blakely Sokoloff Taylor & Zafman LLP

(57) ABSTRACT

Late audio buffer processing for intelligently muting audio output when audio buffers are not read fast enough from disk into digital signal processing (DSP) memory. Given a playback audio recorder, each channel of audio is associated with a forward and a reverse late threshold signals which are enabled when the processing of an audio buffer for that channel is delayed. When an audio buffer for that channel is delayed, the late threshold signal sets in motion the muting of that specific audio channel for a predetermined amount of time. If and when the system catches up, normal playback resumes. Otherwise, the channel stays muted.

21 Claims, 7 Drawing Sheets

METHOD AND APPARATUS FOR LATE BUFFER PROCESSING

BACKGROUND OF THE INVENTION (1) Field of the Invention

The present invention is related to the field of recording and playback of audio information from hard drives and other related media, more specifically, the method and apparatus of the present invention is related to late buffer processing of audio information.

(2) Related Art

Audio processing including editing, playback and recording of audio is an important component of today's multimedia and film related technology. Various factors may disrupt the normal processing of audio information.

One such factor is a delay in the audio processing which disrupts the normal flow of audio output in recording and playback of audio information. For example, if the audio information stored on disk is not read into memory in time, the wrong or obsolete audio information which was previously in memory may be reproduced. In prior art technology, such delay in audio processing has been largely ignored. Consequently, when the program processing audio information attempts to retrieve the audio information from memory, it is often the wrong audio information.

In other prior art technology, the audio processing demand on a system is decreased in an attempt to avoid delays in audio processing. More specifically, channel playback capacity is reduced in order to lower the amount of audio information being processed. For example, a playback recorder having eight audio channels may only allow utilization of three of its eight audio channels thereby reducing channel playback capacity. Since the system demand is only from three audio channels instead of the actually available eight audio channels, the risk that the system will slow down its audio processing is thought to be reduced.

There are many disadvantages related to the prior art technology. One such disadvantage is that the prior art technology does nothing to solve the problem of audio processing delay causing output of unrelated audio information. In such cases, audio information which has already been processed or incomprehensible audio is accessed by the system from memory reproducing unrelated and sometimes unpleasant audio output. Such systems also have no mechanisms for recovering after the system has caught up with its audio processing.

Yet another disadvantage of the prior art technology is the disruption of synchronization caused between audio channels. More specifically, synchronization is disrupted when one or more audio channels reproduce unrelated audio information where the lengths of such unrelated audio information is not equal to the corresponding audio information intended to be synchronously reproduced by other audio channels in the same system.

It is therefore desirable to have a method and apparatus for performing late audio buffer processing without causing disruptions to audio channel synchronization and preventing access to obsolete audio information.

BRIEF SUMMARY OF THE INVENTION

The present invention discloses a method and apparatus for intelligently muting audio output when audio buffers are not read fast enough from disk into digital signal processing (DSP) memory. Given a playback audio recorder, each channel of audio is associated with a forward and a reverse late threshold objects which are enabled when the processing of an audio buffer for that channel is delayed. When an audio buffer for that channel is delayed, the late threshold signal sets in motion the muting of that specific audio channel for a predetermined amount of time. If and when the system catches up, normal playback resumes. Otherwise, the channel stays muted.

A real time module (RTM) of a known period and resolution is utilized to accurately predict when audio buffers should be read from the disk. The RTM also detects when any of the audio buffers are going to be late. When such delay is detected by the RTM, the mute processing is activated.

The method and apparatus of the present invention is advantageous over the prior art technology in that whenever a delay is detected by the present invention, a silence buffer containing mute information is accessed. Access of a silence buffer continues until such time that the system actually catches up and is no longer in a late state. The silence buffer accessed is guaranteed to be as large as the largest possible audio buffer to cover late audio information of any size.

Because the silence buffer is able to compensate for late audio information of any size and the system is continually monitoring its audio information access state, any audio channel which goes into a late state never goes out of synchronization from the remaining audio channels in the system. In other words, the system continues to process audio buffers of the length equal to those being processed by associated audio channels. Therefore, when the audio channel in a late state recovers and has caught up in audio processing, the audio buffer immediately following the silence buffer is accessed at the same time as the associated audio channels access their audio buffers.

DETAILED DESCRIPTION OF THE INVENTION

The present invention discloses a method and apparatus for intelligently muting audio output when audio buffers are not read fast enough from disk into digital signal processing (DSP) memory. Given a playback audio recorder, each channel of audio is associated with a forward and a reverse late threshold signals which are enabled when the processing of an audio buffer for that channel is delayed. When an audio buffer for that channel is delayed, the late threshold signal sets in motion the muting of that specific audio channel for a predetermined amount of time. If and when the system catches up, normal playback resumes. Otherwise, the channel stays muted.

Figure 1:
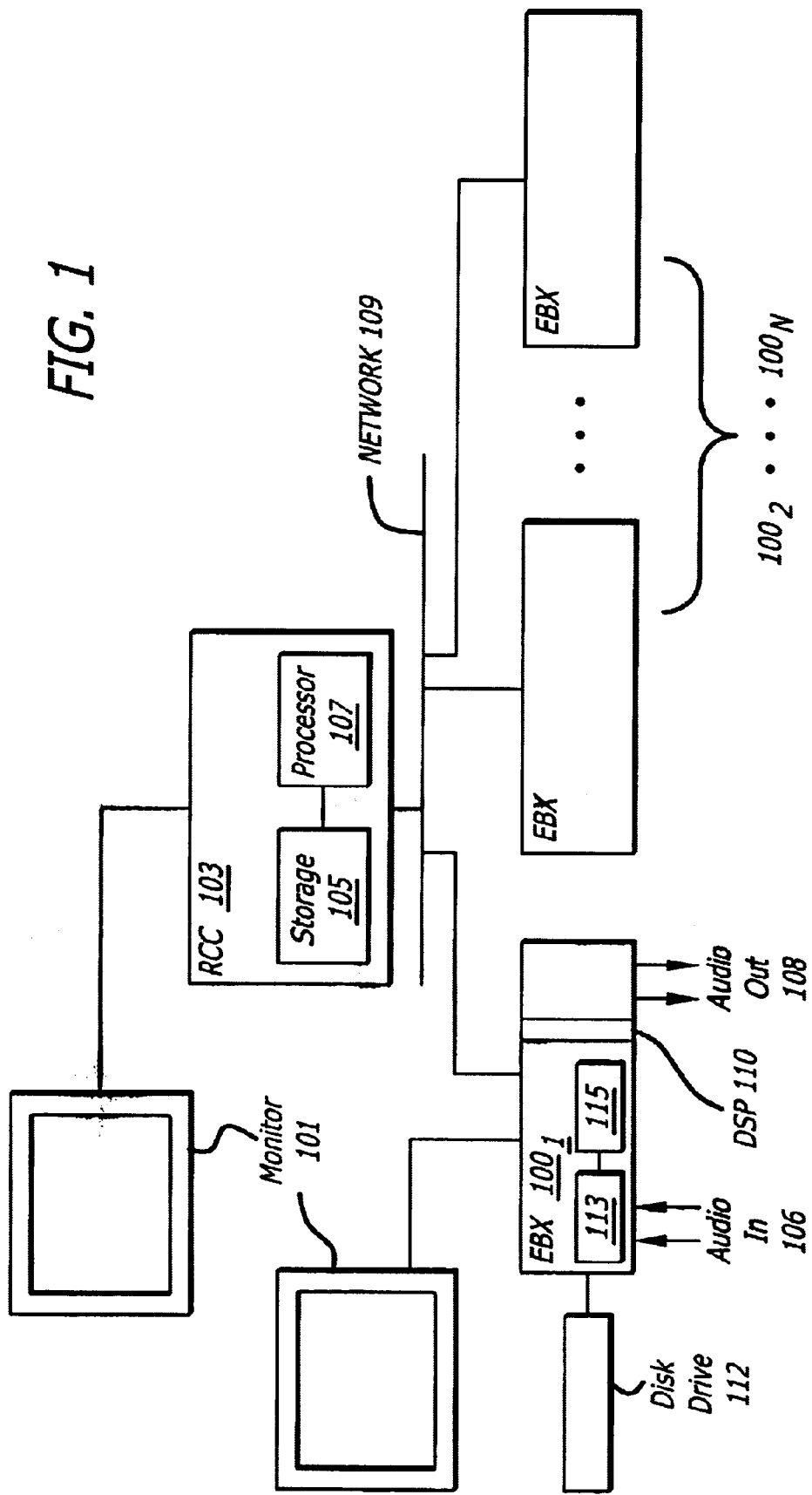
FIG. 1 is an exemplary record playback device.

FIG. 1 is an exemplary illustration of a record/playback system of the present invention. Embedded boxes (EBX's) $100_1 \ldots 100_N$ (also referred as device 100 herein) run applications which control real-time recording and playback of audio information. Each EBX 100 has audio-in channels 106, audio-out channels 108, digital signal processing (DSP) board 110, disk drive 112, storage element 113 and processor 115. Device 100 may be coupled to monitor 101. Further, device 100 may perform recording of audio information onto disk on disk drive 112 or perform a playback of audio information from disk on disk drive 112.

Remote client computer (RCC) 103 coupled to EBX's $100_1 \ldots 100_N$ through network 109 is a device which runs applications providing graphical user interfaces (GUI's) to control the recording/playback of audio on one or more EBX's $100_1 \ldots 100_N$. The GUI's may be displayed on monitor 101 or on a display device coupled to RCC 103 (not shown). RCC 103 also has storage element 105 and processor 107.

The storage elements of EBX 100 and RCC 103 contain data and executable instructions which are described in more detail in the following text and the accompanying Figures. The instructions are executed by the processor on EBX 100 and RCC 103 respectively.

In an alternate embodiment of the present invention, applications and the hardware means for playback and recording of audio information on EBX 100 may reside on RCC 103 effectively providing a combined EBX 100 and RCC 103 medium for manipulation of audio information.

Figure 2:
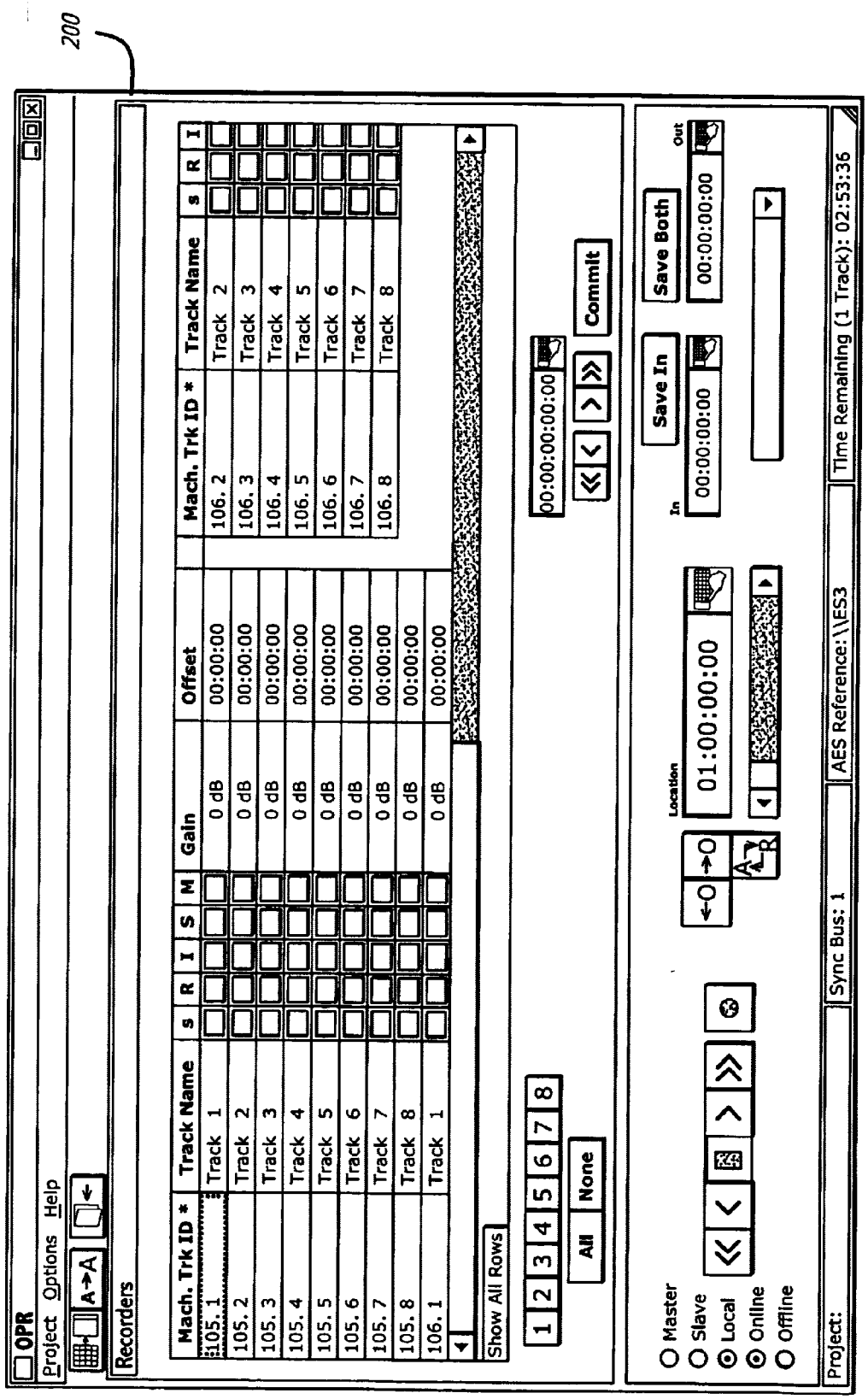
FIG. 2 illustrates an exemplary graphical user interface illustrating the present invention's audio processing system.

FIG. 2 is an exemplary graphical user interface (GUI) 200 used with the present invention's audio processing system. A user may specify various factors in recording audio or playing back audio using GUI 200 displayed on a monitor. The illustrated GUI interface may exist on either EBX 100 or RCC 103. In the alternative, the illustrated GUI may exist on a combined EBX/RCC medium.

Figure 3:
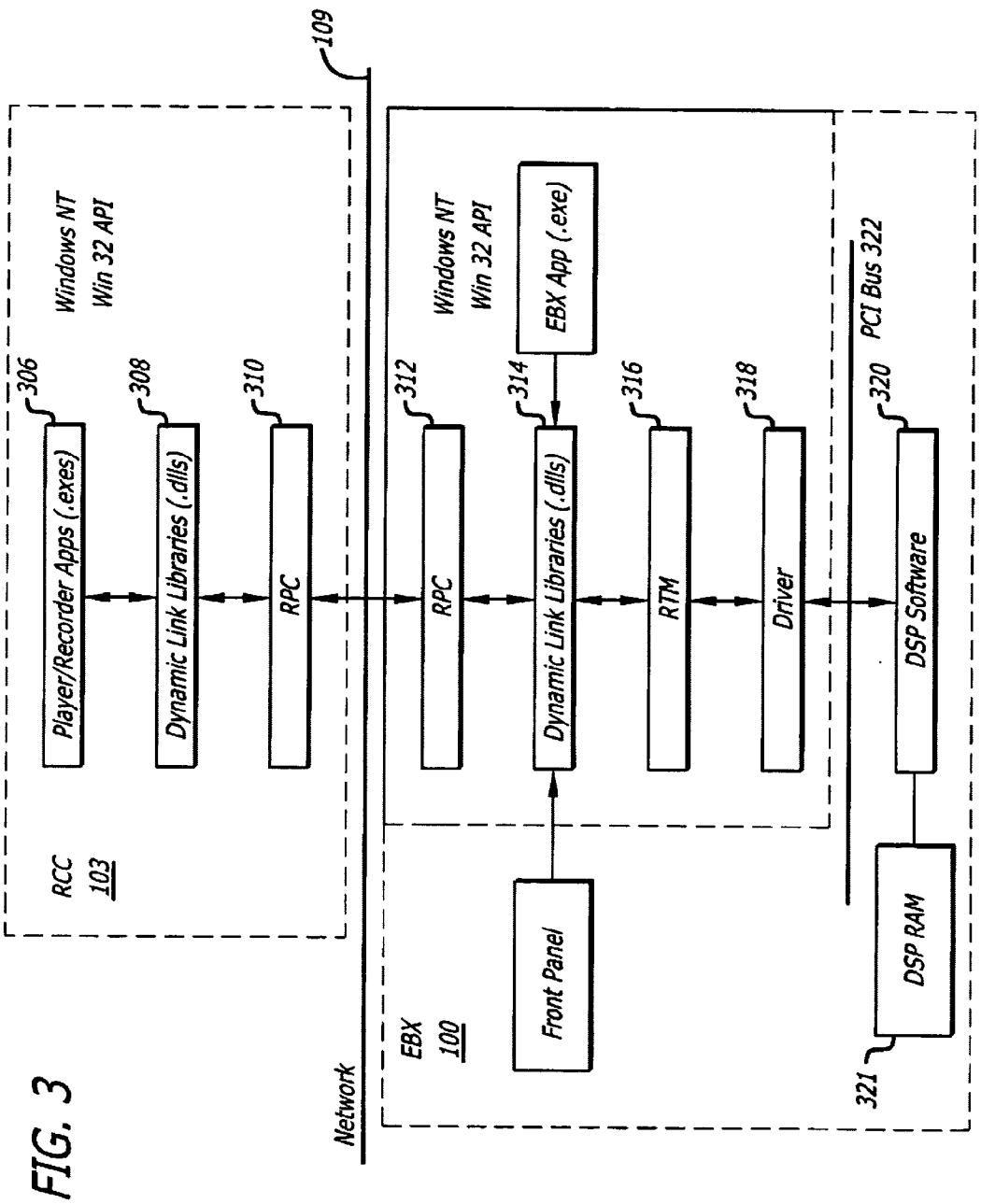
FIG. 3 illustrates an exemplary software architecture block diagram with the implementation of the present invention's system for late buffer processing.

FIG. 3 illustrates an exemplary software architecture block diagram with the implementation of the present invention's system for late buffer processing. RCC 103 is coupled to EBX 100 through network 109. RCC 103 may run on various software platforms including Windows® NT. RCC 103 has a plurality of player/recorder applications 306 coupled to dynamic link libraries (DLL) 308. A DLL is a file containing executable code and data bound to a program at load time or run time rather than during linking. The code and data in DLL 308 can be shared by player/recorder applications 306 simultaneously. RCC 103 also has a remote procedure call mechanism (RPC) 310 allowing transfer of information between RCC 103 and EBX 100 through network 109. EBX 100 also has RPC 312, DLL's 314 and DSP device driver 318 to drive audio information to DSP software 320 across Peripheral Component Interconnect (PCI) bus 322. Further, EBX 100 has real-time module (RTM) 316 which controls various aspects of audio processing on EBX 100.

Figure 4:
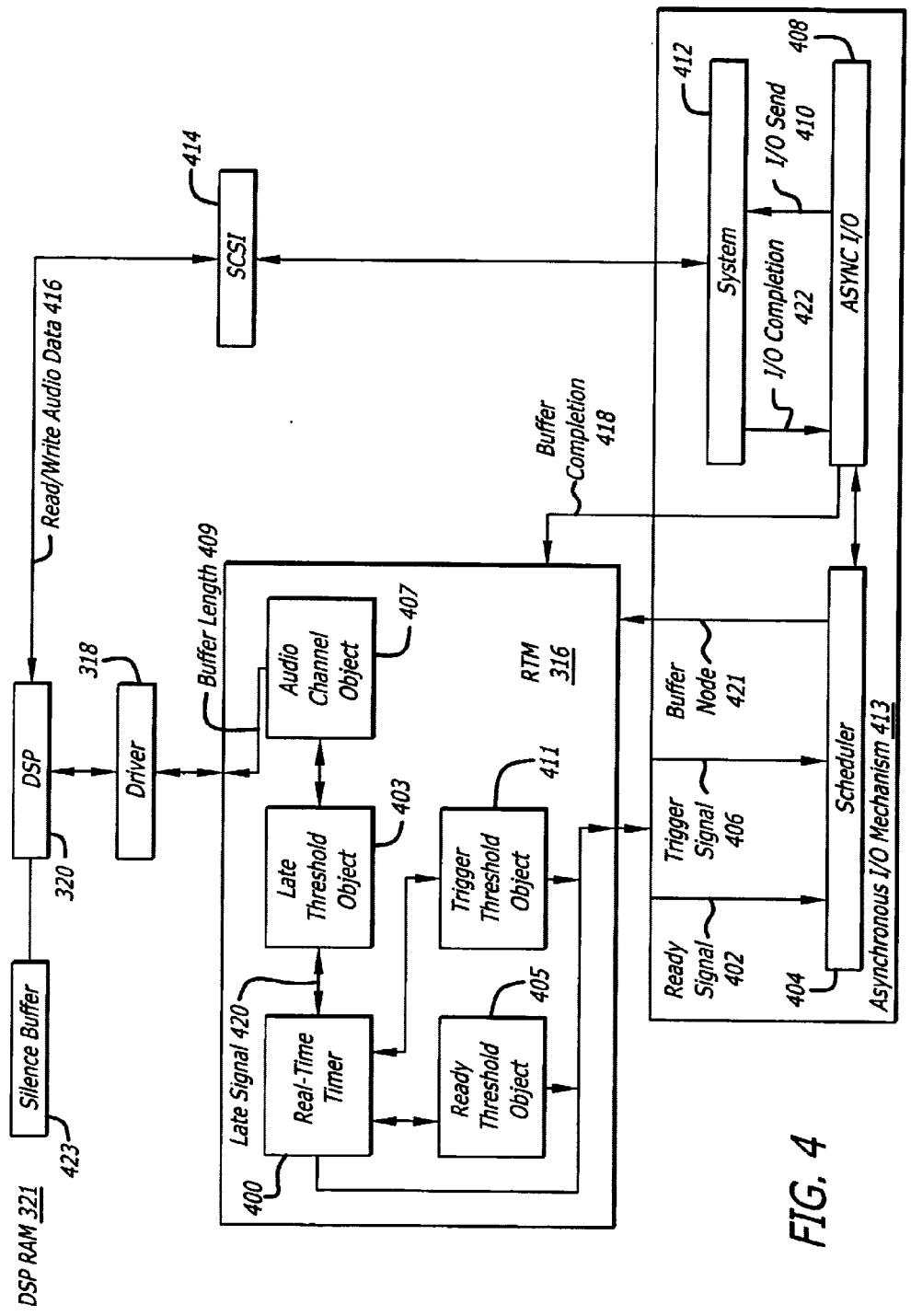
FIG. 4 illustrates an exemplary block diagram of the process flow of the present invention.

FIG. 4 illustrates an exemplary block diagram of the process flow of the present invention. The implementation of the present invention described herein is implemented using objects and object-oriented programming structure. However, it is readily apparent using the detailed description herein that the present invention can be implemented in a variety of methods including by using non-object oriented programming structure.

RTM 316 in FIG. 4 is coupled to asynchronous I/O mechanism 413 having scheduler 404, async I/O module 408 and system 412. Asynchronous I/O mechanism 413 processes the retrieval of audio information to be accessed by DSP 320 in response to signals generated by RTM 316.

Real-time module (RTM) 316 has real-time timer 400, a plurality of late threshold objects 403 for monitoring the timing of current audio processing for delays, a plurality of ready and trigger threshold objects 405 and 411 for monitoring when new audio information is to be retrieved and a plurality of audio channel objects 407 for referencing the lengths of audio buffers to be processed.

Each audio channel to be processed by EBX 100 has at least one late threshold object, one ready threshold object, one trigger threshold object and one audio channel object associated with it. In a presently preferred embodiment of the present invention, each audio channel has a forward and a reverse ready threshold objects 405 and a forward and a reverse trigger threshold objects 411. Further, each audio channel has a forward and a reverse late threshold object 403 associated with it. In one embodiment of the present invention, late threshold object 403, ready threshold object 405, trigger threshold object 411 and audio channel object 407 are generated in the C++ programming language.

Real-time timer 400 and ready threshold object 405 of RTM 316 monitor each audio channel of the system (EBX) to determine whether or not new audio buffers are necessary for a given channel. If RTM 316 detects that new audio buffers are necessary for a channel, then RTM 316 sends ready signal 402 to scheduler 404 indicating that a specific channel will soon need buffer(s).

When trigger threshold object 411 for at least one of the audio channels is enabled, RTM 316 sends trigger signal 406 to scheduler 404. Scheduler 404 then initiates the process to allocate DSP memory and schedule audio I/O's to be read or written into the allocated DSP memory for all channels that previously had ready signals 402 sent.

In addition, scheduler 404 sends buffer node messages 421 to RTM 316 for each channel for which a ready signal was sent. Each buffer node 421 contains the DSP buffer address where new audio information is to be placed. Scheduler 404 also organizes the audio I/O's to be performed between DSP 320 and disk 112 and sends the I/O information including audio information address to async I/O module 408.

Async I/O module 408 initiates audio I/O's by sending I/O information 410 to system 412. System 412 accesses the audio information as referenced in the I/O information received and sends the audio information directly to DSP random access memory (RAM) 321 through SCSI 414 in a read/write audio data action 416.

Async I/O 408 receives completion notification 422 from system 412 when the I/O transfer is completed. Upon receiving completion notification 422, async I/O module 408 sends buffer completion message 418 to RTM 316 for the audio channel for which the buffer was processed. RTM 316 then communicates to DSP 320 using DSP commands through DSP device driver 318 indicating that audio information is now available for access.

If RTM 316 detects that audio processing is late, then RTM 316 sends a buffer message to DSP 320 using real-time timer 400 and late threshold object 403 to use silence audio buffer 423. Silence audio buffer 423 contains mute audio (silence) information and resides in DSP RAM 321. The length of silence that is played is determined by the length of the buffer that is late.

More specifically, the length of each audio information is indicated in its corresponding audio node in an audio node mapping list. The audio node mapping list is a linked list of audio nodes which contain information including audio length and DSP buffer address for each audio buffer to be accessed by the DSP for processing. Audio channel object 407 extracts the length information from the audio node in the audio node mapping list corresponding to the late audio information and sends the length information to DSP 320 via RTM 316. DSP 320 then plays or records silence buffer 423 only up to the length defined in the length information provided. Meanwhile, monitoring of the current status of each audio channel in an EBX continues.

Figure 5A:
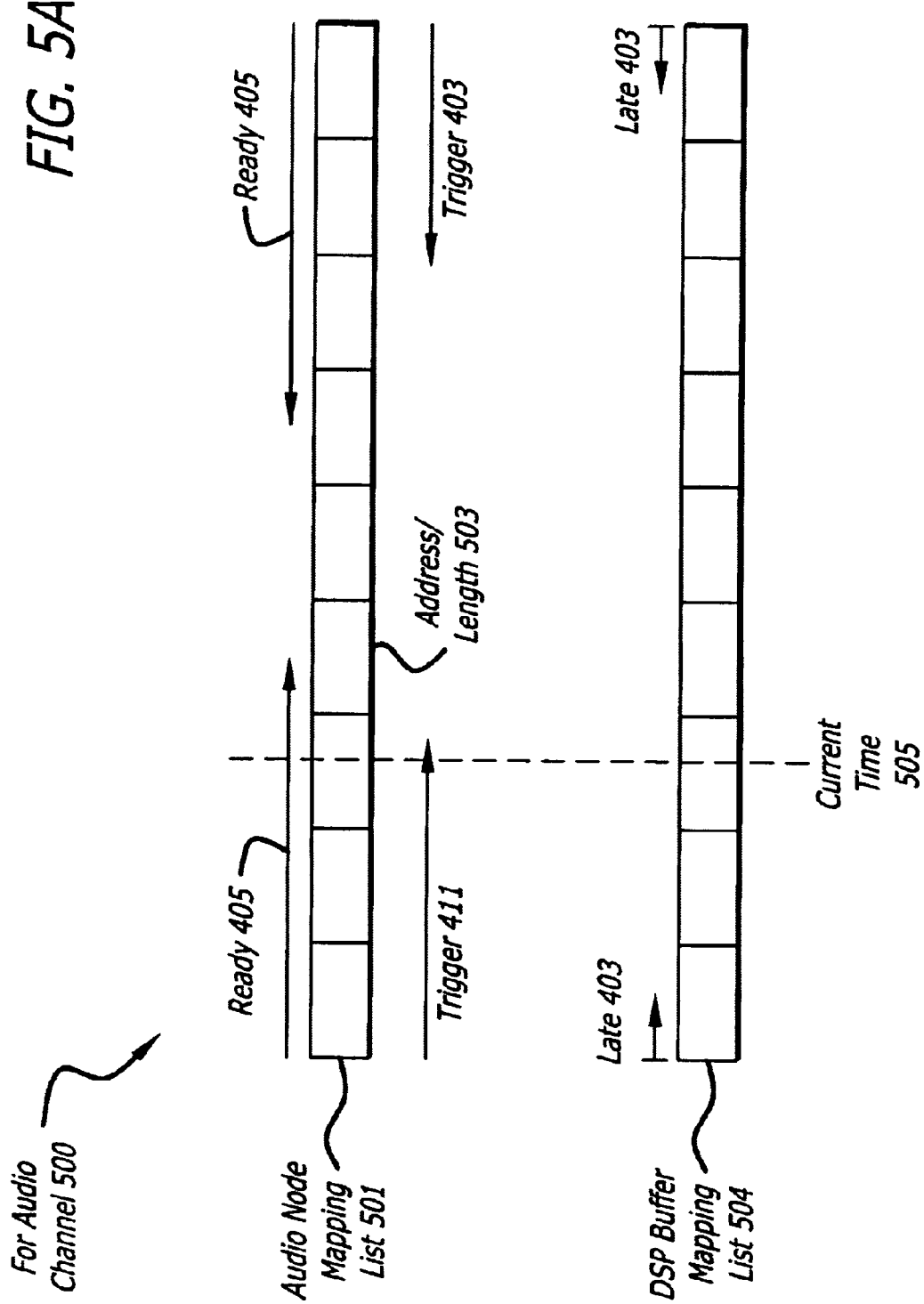
FIG. 5a is exemplary linked list of nodes associated with each audio channel in an EBX.

FIG. 5a illustrates an exemplary linked list of nodes associated with each audio channel in an EBX. Each audio channel (500) has audio node mapping list 501 and DSP buffer mapping list 504. Both are linked lists of nodes. Each node contains information regarding audio information to be processed including address and length information 503. The audio node mapping list keeps track of all buffer nodes in response to buffer node signal 421. The DSP buffer mapping list 504 tracks all nodes in the audio node mapping list that have been completed in response to buffer completion signal 418.

Audio node mapping list 501 has an associated forward and reverse ready threshold objects 405 and a forward and reverse trigger threshold objects 411. The forward and reverse objects are related to the forward and reverse motions capable in playing and recording audio information. Current time 505 is an internal software clock which keeps time and is monitored by real-time timer 400 of RTM 316 which keeps track of the objects of each audio channel.

If current time 505 comes within ready threshold object 405 of a given audio channel, ready threshold object 405 is enabled to send ready signal 402 to scheduler 404 indicating that the audio channel associated with that specific ready threshold object is ready for audio information. When current time 505 comes within trigger threshold object 411, trigger threshold object is enabled to send trigger signal 406 to scheduler 404 indicating that buffers must be allocated to all audio channels for which a ready signal has been sent.

Once buffer completion 418 is received by RTM 316 after system 412 has accessed and transmitted audio information to DSP RAM 321, the buffer node containing the DSP RAM address of the audio information is copied from the audio node mapping list 501 to DSP buffer mapping list 504. In addition, a message is sent from RTM 316 to DSP 320 indicating that DSP 320 may then access the audio data. Further, late threshold object 403 is moved to the end of DSP buffer mapping list 504 to prevent activation.

If there is a delay in the audio processing, late buffer processing is activated through the forward or reverse late threshold objects 403 associated with DSP buffer mapping list 504 of each audio channel.

Figure 5B:
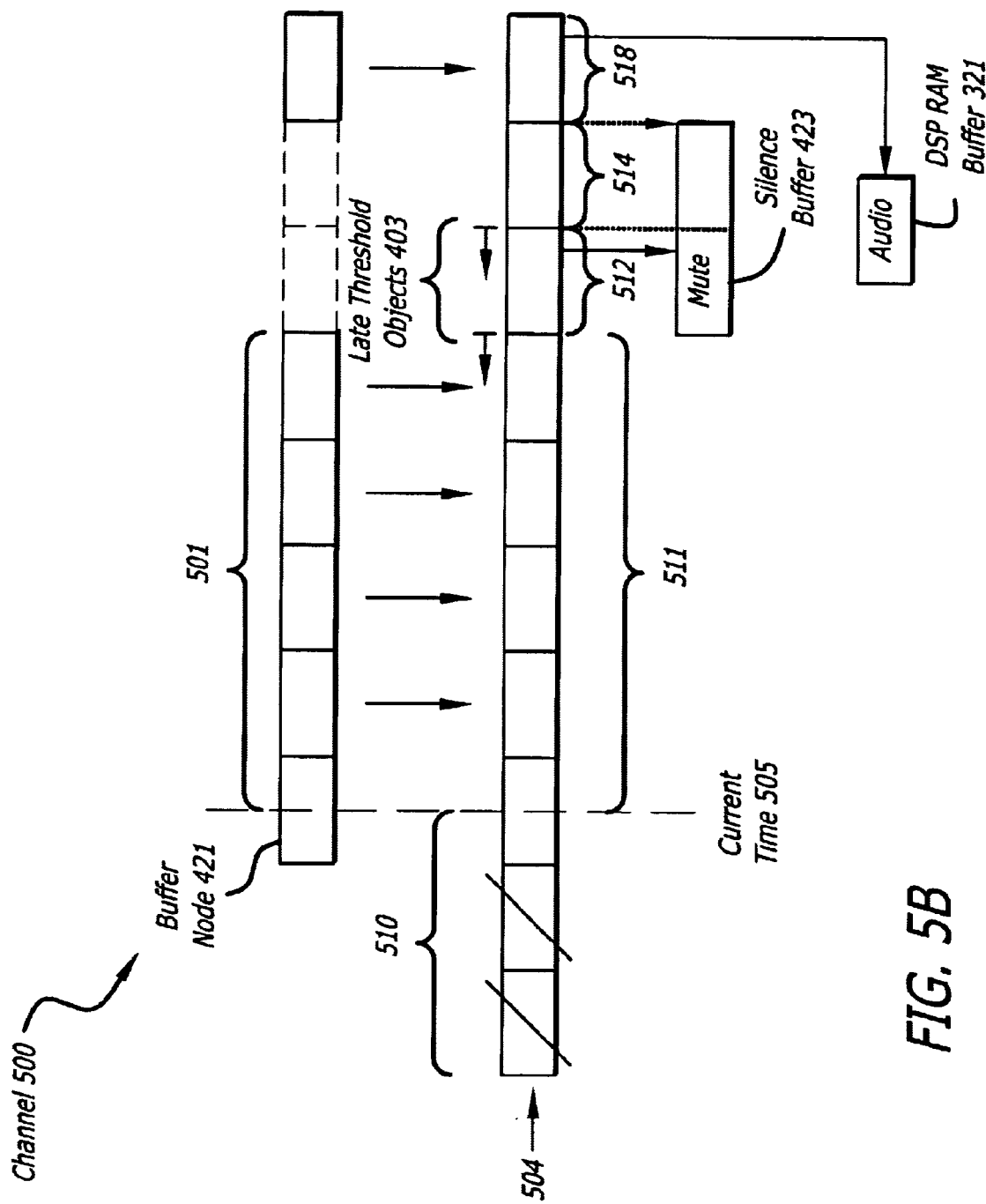
FIG. 5b is an illustration of an exemplary audio channel being processed in relation to the present invention's late signal.

FIG. 5b illustrates exemplary node lists of the present invention as related to late buffer processing. Nodes 510 located to the left of current time 505 refer to buffers which contents have already been recorded or played back. Buffers associated with nodes 510 are consequently freed up for future use. Nodes 511 located to the right of current time 505 refer to audio buffers either currently being processed or to be processed.

Audio node mapping list 501 contains nodes that point to buffers that are to be filled by async I/O mechanism 413. When buffer completion notify 418 is sent from async I/O 408 to RTM 316 for a given buffer, the corresponding buffer node is copied to DSP buffer mapping list 504 and a message is sent to DSP 320 that the buffer is available. A late signal is enabled if current time 505 comes within late threshold object 403 where a buffer node associated with a completion notify 418 does not exist in DSP buffer mapping list 504. In this case, silence buffer 423 is used to fill the void and a message is sent to DSP 320 to use silence buffer 423 for that audio channel.

Silence buffer 423 is defined to be at least as large as the largest possible audio buffer capable of being processed by EBX 100. If late threshold object 403 of a given audio channel is enabled, audio channel object 407 of that audio channel sends the length information of the audio which is late to DSP 320. DSP 320 then plays or records silence buffer 423 only up to the length indicated by the received length information.

Figure 6:
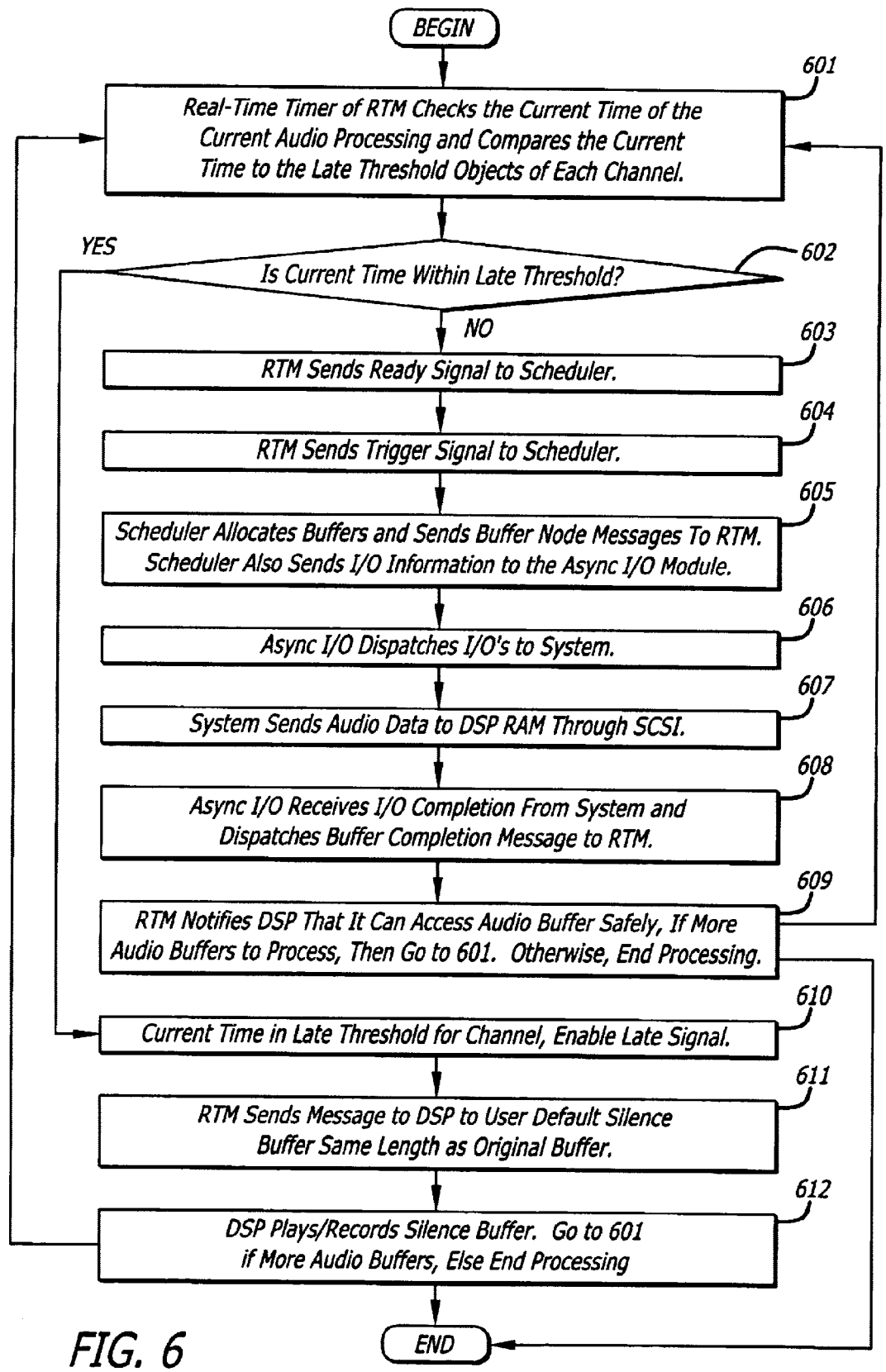
FIG. 6 is a flow diagram illustrating the general steps followed in one embodiment of the present invention.

FIG. 6 is a flow diagram illustrating the general steps followed by the present invention. In step 601, real-time timer 400 of RTM 316 checks current time 505 of the current audio processing and compares current time 505 to late threshold object 403 associated with each audio channel in the system. In step 602, if current time 505 is within late threshold time of late threshold object 403, then go to step 610 for late buffer processing. Otherwise real-time timer 400 continues to monitor late threshold object 403.

In step 603, real-time timer 400 activates a ready threshold object of at least one audio channel indicating that the audio channel is ready to receive audio information. RTM 316 therefore sends ready signal 402 to scheduler 404. In step 604, real-time timer 400 is activates a trigger threshold of at least one audio channel. RTM 316 then sends trigger signal 406 to scheduler 404. In step 605, scheduler 404 allocates buffers for all audio channels for which a ready signal was sent and transmits buffer node messages 421 to RTM 316. Further, scheduler 404 transmits I/O information to async I/O module 408.

In step 606, async module 408 dispatches I/O requests to system 412. In step 607, System 412 transmits audio data to DSP RAM 321 through SCSI 414. In step 608, async I/O module 408 receives I/O completion 422 from system 412 and dispatches buffer completion message 418 to RTM 316. In step 609, RTM 316 notifies DSP 320 using DSP commands through DSP driver 318 that DSP 320 is now able to access audio buffers safely.

In step 610, if current time 505 is within the late threshold defined in late threshold object 403 of any of the audio channels, then the late signal associated with the late audio channel is enabled and mute processing is triggered. In step 611, RTM 316 sends a message to DSP 320 using DSP commands through device driver 318 to use silence buffer 423. In step 612, DSP 320 receives the message from RTM 316 containing the length of the original buffer which was to be used and plays or records the audio information of the same length in silence buffer 423 in DSP RAM 321.

Meanwhile, the current state of each audio channel continues to be monitored. Normal audio processing resumes if no late threshold object is enabled for the next audio buffer to be filled. Otherwise, late buffer processing is triggered as was described above.

What has been described is a method and apparatus for late audio buffer processing. The present invention may be implemented with audio player playback/record devices with multiple channels.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for late audio buffer processing comprising:
    monitoring a current time for at least one late threshold for at least one audio channel on an audio playback and record medium, said at least one late threshold associated at least one said audio channel;
    monitoring a trigger threshold object for the at least one said audio channel to initiate retrieval of audio data;
    enabling said late threshold if the current time indicates a next audio data is not made available within a predetermined period of time defined by a corresponding at least one late threshold value;
    providing access to a silence buffer being processed in place of next audio data and sending a buffer length of said audio data which is late to a digital signal processor which has access to said silence buffer.

2. The method of claim 1 wherein providing access to the silence buffer is performed in response to enabling said late threshold.

3. The method of claim 1 wherein said digital signal processor processes said silence buffer up to the length defined in said buffer length.

4. The method of claim 3 further comprising returning to normal audio processing if an audio data following said next audio data is made available within said predetermined period of time.

5. The method of claim 1 wherein said at least one late threshold comprises a reverse and a forward late threshold.

6. A method for late audio buffer processing comprising:
    monitoring a current time for at least one late threshold for at least one audio channel on an audio playback and record medium, said at least one late threshold associated at least one said audio channel,
    monitoring at least one ready threshold and at least one trigger threshold of each said audio channel in an audio node mapping list, said audio node mapping list being a linked list of buffer nodes having buffer node addressing information for each audio data to be placed in a buffer corresponding to a buffer node in said audio node mapping list;
    enabling said late threshold if the current time indicates a next audio data is not made available within a predetermined period of time defined by a corresponding at least one late threshold value;
    providing access to a silence buffer being processed in place of next audio data.

7. The method of claim 6 wherein said at least one ready threshold comprises a forward and a reverse ready threshold for each said audio channel.

8. The method of claim 7 wherein said at least one ready threshold is enabled if said current time is within a ready threshold as defined in said at least one ready threshold.

9. The method of claim 8 wherein said at least one trigger threshold is enabled if said current time is within a trigger threshold as defined in said at least one ready threshold, said at least one trigger threshold being enabled after said at least one ready threshold is enabled.

10. The method of claim 9 further comprising initiating access to audio data for each said audio channel if said at least one trigger threshold is enabled.

11. The method of claim 10 further comprising copying buffer address information from said audio node mapping list to a buffer mapping list, said copying allowing a digital signal processor to have reference to the buffer address to which said audio data is to be placed.

12. The method of claim 11 further comprising retrieving said audio data for placement in said buffer address and for access by said digital signal processor.

13. The method of claim 6 wherein said at least one trigger threshold comprises a forward and a reverse trigger threshold for each said audio channel.

14. An audio playback record apparatus comprising:
    a plurality of buffer mapping lists, each said plurality of buffer mapping lists associated with each audio channel on the apparatus, each said plurality of buffer mapping lists having a plurality of buffer nodes with buffer address information for each buffer to which an audio data is to be placed;
    a real time module (RTM) having at least one late threshold coupled to each said plurality of buffer mapping lists, said at least one late threshold configured to be enabled if next audio data to be processed is not received within a predetermined time;
    a silence buffer coupled to one of said buffers on one of said plurality of buffer mapping lists for which said at least one late threshold was enabled, said silence buffer configured to be processed in place of said next audio data; and
    an asynchronization input/output mechanism configured to retrieve audio data in response to a trigger signal from said at least one late threshold and to schedule said silence buffer in response to receipt of a late signal from said late threshold.

15. The apparatus of claim 14 further comprising a plurality of audio node mapping lists, each said plurality of audio node mapping lists associated with each audio channel on the device, each said plurality of audio node mapping lists having a plurality of buffer nodes with buffer address information for each buffer to which an audio data is to be placed.

16. An audio playback record apparatus comprising:
    a plurality of buffer mapping lists, each said plurality of buffer mapping lists associated with each audio channel on the apparatus, each said plurality of buffer mapping lists having a plurality of buffer nodes with buffer address information for each buffer to which an audio data is to be placed;
    a real time module (RTM) having at least one late threshold coupled to each said plurality of buffer mapping lists, said at least one late threshold configured to be enabled if next audio data to be processed is not received within a predetermined time, said RTM further comprises (i) a real time timer coupled to said late threshold, said real time timer configured to monitor each audio channel on the device for timely processing of said audio data and (ii) at least one ready threshold associated with each audio channel on the apparatus, said at least one ready threshold configured to indicate when the apparatus is ready to accept audio data for processing, said at least one ready threshold for an audio channel coupled to a corresponding one of a plurality of audio node mapping list; and
    a silence buffer coupled to one of said buffers on one of said plurality of buffer mapping lists for which said at least one late threshold was enabled, said silence buffer configured to be processed in place of said next audio data.

17. The apparatus of claim 16 further comprising an asynchronization input/output mechanism configured to retrieve audio data in response to a trigger signal from said at least one late threshold, said scheduler configured to schedule said silence buffer in response to receipt of a late signal from said late threshold.

18. An audio playback record apparatus comprising:
   a plurality of buffer mapping lists, each said plurality of buffer mapping lists associated with each audio channel on the apparatus, each said plurality of buffer mapping lists having a plurality of buffer nodes with buffer address information for each buffer to which an audio data is to be placed;
   a real time module (RTM) having at least one late threshold coupled to each said plurality of buffer mapping lists, said at least one late threshold configured to be enabled if next audio data to be processed is not received within a predetermined time, said RTM further comprises (i) a real time timer coupled to said late threshold, said real time timer configured to monitor each audio channel on the device for timely processing of said audio data and (ii) at least one trigger threshold associated with each audio channel, said at least one trigger threshold configured to trigger the actual retrieval of said audio data, said at least one trigger threshold for an audio channel coupled to a corresponding one of said plurality of audio node mapping list; and
   a silence buffer coupled to one of said buffers on one of a plurality of buffer mapping lists for which said at least one late threshold was enabled, said silence buffer configured to be processed in place of said next audio data.

19. A system comprising:
   a storage element that comprises,
      a plurality of buffer mapping lists, each said plurality of buffer mapping lists associated with each audio channel on the system, each said plurality of buffer mapping lists having a plurality of buffer nodes with buffer address information for each buffer to which an audio data is to be placed,
      a real time module (RTM) having at least one late threshold coupled to each buffer on each said plurality of buffer mapping lists, said at least one late threshold configured to be enabled if next audio data to be processed is not received within a predetermined time, said RTM further comprises a real time timer configured to monitor each audio channel on the system for timely processing of said audio data,
      a plurality of audio node mapping lists, each said plurality of audio node mapping lists associated with each audio channel on the device, each said plurality of audio node mapping lists having a plurality of buffer nodes with buffer address information for each buffer to which an audio data is to be placed;
      a silence buffer coupled to one of said buffers on one of said plurality of buffer mapping lists for which said at least one late threshold was enabled, said silence buffer configured to be processed in place of said next audio data; and
   a processor coupled to said storage element, said processor for executing said RTM.

20. A system comprising:
   a storage element that comprises,
      a plurality of buffer mapping lists, each said plurality of buffer mapping lists associated with each audio channel on the system, each said plurality of buffer mapping lists having a plurality of buffer nodes with buffer address information for each buffer to which an audio data is to be placed,
      a real time module (RTM) having at least one late threshold coupled to each buffer on each said plurality of buffer mapping lists, said at least one late threshold configured to be enabled if next audio data to be processed is not received within a predetermined time, said RTM further comprises a real time timer configured to monitor each audio channel on the system for timely processing of said audio data, and at least one ready threshold associated with each audio channel on the device, said at least one ready threshold configured to indicate when the device is ready to accept audio data for processing, said at least one ready threshold for an audio channel coupled to a corresponding one of said plurality of audio node mapping list,
      a silence buffer coupled to one of said buffers on one of a plurality of buffer mapping lists for which said at least one late threshold was enabled, said silence buffer configured to be processed in place of said next audio data; and
   a processor coupled to said storage element, said processor for executing said RTM.

21. A system comprising:
   a storage element that comprises,
      a plurality of buffer mapping lists, each said plurality of buffer mapping lists associated with each audio channel on the system, each said plurality of buffer mapping lists having a plurality of buffer nodes with buffer address information for each buffer to which an audio data is to be placed,
      a real time module (RTM) having at least one late threshold coupled to each buffer on each said plurality of buffer mapping lists, said at least one late threshold configured to be enabled if next audio data to be processed is not received within a predetermined time, said RTM further comprises a real time timer configured to monitor each audio channel on the system for timely processing of said audio data, and at least one trigger threshold associated with each audio channel on the device, said at least one trigger threshold configured to trigger the actual retrieval of said audio data, said at least one trigger threshold for an audio channel coupled to a corresponding one of a plurality of audio node mapping lists,
      a silence buffer coupled to one of said buffers on one of a plurality of buffer mapping lists for which said at least one late threshold was enabled, said silence buffer configured to be processed in place of said next audio data; and
   a processor coupled to said storage element, said processor for executing said RTM.

* * * * *